(12) United States Patent
Conard et al.

(10) Patent No.: US 11,532,243 B2
(45) Date of Patent: Dec. 20, 2022

(54) DISPLAY FOR BRAILLE TABLET

(71) Applicant: Freedom Scientific, Inc., Clearwater, FL (US)

(72) Inventors: Todd Conard, Ruskin, FL (US); Patrick Murphy, Lithia, FL (US); Carl Edwin Wise, St. Petersburg, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 115 days.

(21) Appl. No.: 17/180,447

(22) Filed: Feb. 19, 2021

(65) Prior Publication Data

US 2021/0264814 A1 Aug. 26, 2021

Related U.S. Application Data

(60) Provisional application No. 62/979,595, filed on Feb. 21, 2020.

(51) Int. Cl.
*G09B 21/00* (2006.01)

(52) U.S. Cl.
CPC ......... *G09B 21/004* (2013.01); *G09B 21/005* (2013.01)

(58) Field of Classification Search
None
See application file for complete search history.

(56) References Cited

U.S. PATENT DOCUMENTS

| | | | |
|---|---|---|---|
| 5,466,154 A | 11/1995 | Thompson | |
| 5,580,251 A | 12/1996 | Gilkes et al. | |
| 6,542,623 B1 | 4/2003 | Kahn | |
| 8,690,576 B2 * | 4/2014 | Murphy | G09B 21/004 434/114 |
| 11,062,623 B2 * | 7/2021 | Murphy | G09B 21/004 |
| 11,145,223 B2 * | 10/2021 | Califorrniaa | G09B 21/007 |
| 2009/0023116 A1 * | 1/2009 | Shaw | G09B 21/003 434/114 |
| 2009/0104587 A1 * | 4/2009 | Fabrick, II | G09B 21/00 434/113 |
| 2009/0220923 A1 * | 9/2009 | Smith | G09B 21/003 434/113 |

(Continued)

FOREIGN PATENT DOCUMENTS

| | | | | |
|---|---|---|---|---|
| IN | 201841006427 A | * | 4/2019 | G09B 21/004 |
| JP | 2018013692 A | | 1/2018 | |

(Continued)

OTHER PUBLICATIONS

American Printing House for the Blind, Inc., "Refreshabraille 18 Gen 3.0 User's Guide," RB 18 Gen 2.0 User's Guide (pre-Aug. 2015). [Online] Jul. 27, 2015; [Retrieved from the Internet Apr. 13, 2021] https://tech.aph.org/rbd_doc.htm, pp. 1-30.

*Primary Examiner* — Vinh T Lam
(74) *Attorney, Agent, or Firm* — GrayRobinson, P.A.; Michael J. Colitz, III (57) ABSTRACT

Disclosed is a tablet with an improved Braille display. The Braille display employs a pin array that allows for the selective use of either six or eight pin cells. This is accomplished by turning off or on a pin pair adjacent to each cell. The spacing of the pins also allows capacitive sensors to be located adjacent to each Braille cell. These sensors are used to determine the location of the user's finger upon the display. The pin spacing further allows geometric shapes to be generated in additional to text.

16 Claims, 5 Drawing Sheets

(56) References Cited

U.S. PATENT DOCUMENTS

| | | | |
|---|---|---|---|
| 2013/0321302 A1 | 12/2013 | Naccache et al. | |
| 2014/0242555 A1* | 8/2014 | Murphy | G09B 21/004 434/113 |
| 2015/0125831 A1 | 5/2015 | Nair et al. | |
| 2015/0379895 A1 | 12/2015 | Chari | |
| 2018/0342176 A1* | 11/2018 | Califorrniaa | G09B 21/004 |
| 2018/0366031 A1* | 12/2018 | Murphy | G06F 3/016 |
| 2020/0251015 A1* | 8/2020 | Murphy | G09B 21/004 |
| 2020/0294419 A1* | 9/2020 | Belomoev | G06F 3/00 |

FOREIGN PATENT DOCUMENTS

| | | | | |
|---|---|---|---|---|
| WO | WO-2018236805 A1 * | 12/2018 | | G06F 3/016 |
| WO | WO-2019229501 A1 * | 12/2019 | | G09B 21/004 |
| WO | WO-2020106855 A1 * | 5/2020 | | G06F 3/016 |

\* cited by examiner

DISPLAY FOR BRAILLE TABLET

CROSS REFERENCE TO RELATED APPLICATIONS

This application claims priority to U.S. Application Ser. No. 62/979,595, filed Feb. 21, 2020, and entitled "Display for Braille Tablet," the contents of which are fully incorporated herein for all purposes.

TECHNICAL FIELD

This disclosure relates to a display for a Braille tablet. More particularly, the present disclosure relates to various displays with an improved ability to locate the position of a user's finger upon the display.

BACKGROUND OF THE INVENTION

Braille displays are well known in the art. These devices allow the visually impaired to perceive individual Braille characters via tactile pins that can be selectively raised and lowered. These pins are arranged into an array consisting of a number of cells. Each cell, in turn, typically consists of six pins. Braille displays are adapted to be connected to a computer, or similar electronic device, to allow a visually impaired individual to perceive textual information. Often times, this information is present upon a screen. For this reason, Braille displays are refreshable and allow new rows of information to be continually presented to the user. Although Braille displays most often display textual characters, the pins can be used to generate geometric shapes. Braille displays may optionally include a keyboard to allow the user to input text. This may be a standard QWERTY keyboard or a dot type keyboard. Dot type keyboards feature keys that correspond to the individual dots of a Braille character. Regardless of the type utilized, the inputted text can be entered into a computer memory for subsequent retrieval. The inputted text can also be presented upon the display. Cursor router keys may be included within the keyboard to allow the user to insert text into a particular location upon the Braille display.

Braille displays frequently include individual cells featuring a six pin array, consisting of two columns of three pins each. Each of the pins forms a dot in the Braille character. There are sixty four possible character combinations for an individual six pin array. An individual cell can be used to represent an individual letter, a digit, a punctuation mark, or even a word. Some Braille displays alternatively employ an eight pin array in lieu of a six pin array. Eight pin arrays allow the encoding of a greater number of symbols. For example, the lowermost pins in an eight pin array can be used to differentiate between lower case and upper case characters. Eight pin arrays, for this reason, are often used to display more formal writing, such as academic texts.

Various efforts have been made throughout the years to improve the functionality of Braille displays. For example, U.S. Patent Pub. 2013/0321302 to Naccache discloses a device for keying in Braille data and a corresponding computer program. The device includes a touch sensitive surface and is configured to detect a plurality of pressures. The plurality of pressures serve to form different Braille characters. An image can be constructed from the points associated with the plurality of different pressures.

Additionally, U.S. Patent Pub. 2015/0125831 to Chandrashekhar discloses a handheld electronic device with a tactile pin array. The device comprises a set of cameras that can capture an image. The image is thereafter processed and used to output a three dimensional representation of the image on the pin array. This allows one to recognize objects and obstacles in the area in front of the device. It also allows for navigation capabilities, facial recognition, and various input/output means.

An additional tactile display is disclosed by U.S. Patent Pub. 2015/0379895 to Chari. The display of Chari provides a representation of a graph or other image generated by a graphic device for visually impaired users. The display includes a frame assembly with hollow shaft chambers that are perpendicular to a number of hollow actuator members. Drive shafts are received within the hollow shaft chambers. Each drive shaft can be moved up and down via cams.

Although the background art contains several examples of tactile display constructions, they all suffer from common drawbacks. Namely, the displays of the background art fail to allow users to selectively use either six or eight pin cells. Nor does the background art disclose a display that can effectively display both Braille characters and Braille graphics. Known Braille displays also lack a means for accurately and conveniently tracking the position of the user's finger over the display. The improved Braille display of the present disclosure is aimed at overcoming these and other deficiencies present in the background art.

SUMMARY OF THE INVENTION

The present disclosure relates to the tablet with an improved Braille display.

One advantage of the present display is realized by providing a pin pitch that permits the selective use of either six or eight pin arrays.

A further advantage is realized by providing a pin arrangement that can display both individual Braille characters as well as Braille graphics.

The pins of the display are advantageously positioned to allow capacitive sensors to be placed immediately adjacent each Braille cell.

The positioning of capacitive sensors adjacent to the Braille cells allows the position of the user's finger to be detected and tracked.

Still yet an additional advantage is attainted by including a physical button that when depressed allows the user to move a cursor to a location adjacent to the user's finger on the display.

A further advantage is realized by creating a space between adjacent Braille cells to accommodate a number of capacitive touch sliders.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

| Parts List |
| --- |
| 20 Tablet |
| 22 Display |
| 24 Array of pins |
| 26 Face of display |
| 28 Individual pin in array |
| 32 Pin pairs |
| 34 Cells |
| 36 Six pin cell |
| 38 Eight pin cell |
| 42 Spacing along Y-axis |
| 44 Spacing along X-axis |
| 46 Braille character |
| 48 Braille graphic |
| 50 Apertures in PCB |
| 52 Printed Circuit Board |
| 53 Inner Surface |
| 54 Microprocessor |
| 55 Drive Lines |
| 56 Metallic strips |
| 57 Resistors |
| 58 Pin block |
| 62 Pin weights |
| 64 Dot Keys |
| 66 Space Bar |

DETAILED DESCRIPTION OF THE DRAWINGS

The present disclosure relates to a tablet with an improved Braille display. The Braille display employs a pin array that allows for the selective use of either six or eight pin cells. This is accomplished by turning off or on a pin pair adjacent to each cell. The spacing of the pins also allows capacitive sensors to be located adjacent to each Braille cell. These sensors are used to determine the location of the user's finger upon the display. The pin spacing further allows geometric shapes to be generated in addition to text. The various features of the present disclosure, and the manner in which they interrelate, are described in greater detail hereinafter.

Braille Tablet with Asymmetrical Pin Pitch

Figure 1:
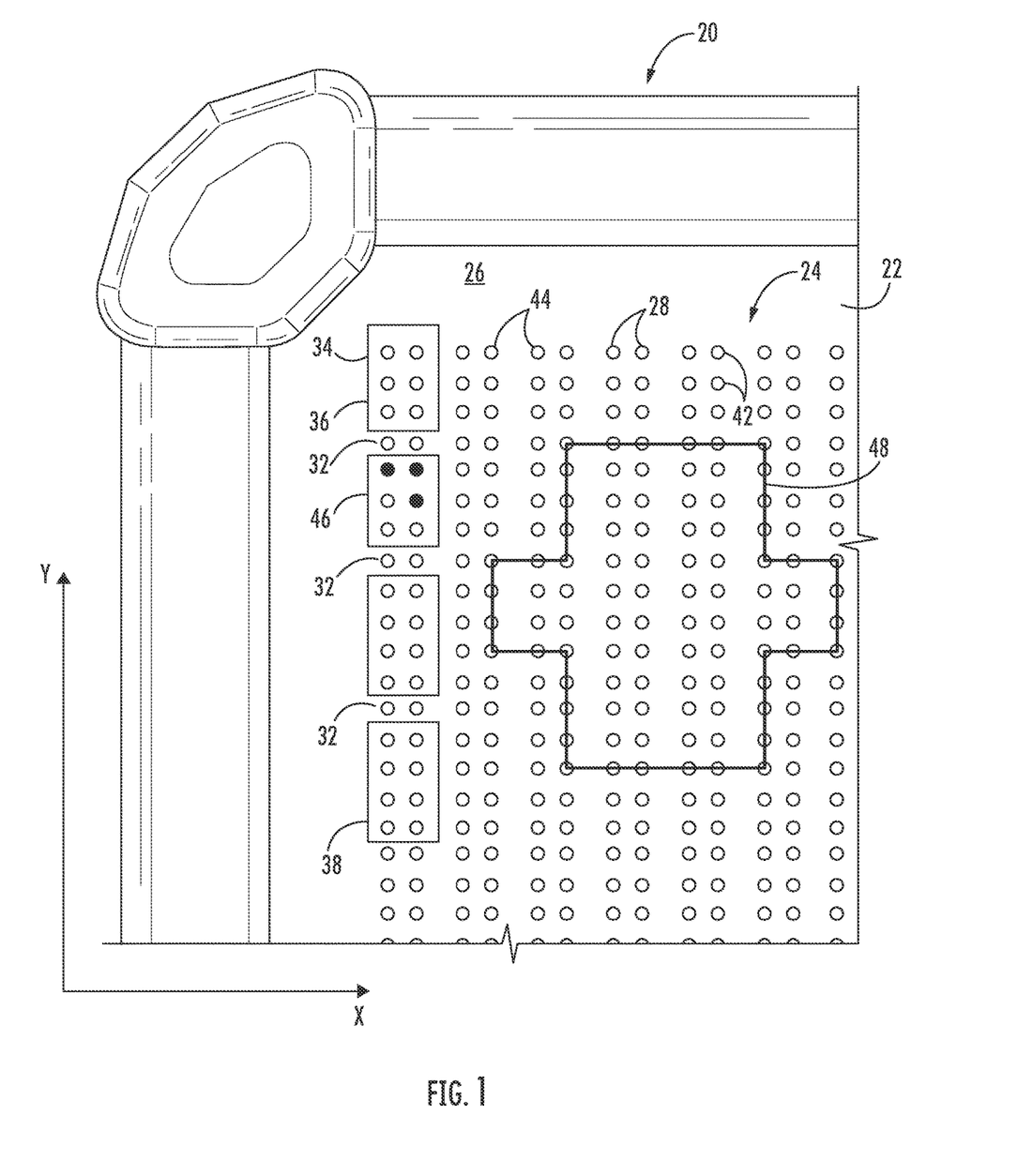
FIG. 1 is a partial plan view of the outer surface of the present tactile display.

FIG. 1 illustrates a Braille tablet 20 with a refreshable display 22. Display 22 is formed from an array of Braille pins 24 that are positioned across an outer face 26. A number of individual pins 28 form part of a larger Braille cell 34 and can be selectively raised or lowered to generate a Braille character. This can be accomplished via any of a variety of known technologies; such as biomorph reeds, electromagnetic actuators, or piezo mechanisms. As illustrated, pins 28 are positioned along both X and Y axes. With continuing reference to FIG. 1, it can be seen that a series of pin pairs 32 are oriented along the Y axis. Each pin pair 32 is positioned adjacent to a Braille cell 34. Pin pairs 32 preferably consist of two side-by-side pins 28. In accordance with the disclosure, each pin pair 32 can either be added to or removed from an adjacent Braille cell 34 to thereby generate either a six or an eight pin cell (36 or 38).

As is known in the art, each cell 34, is used to generate a corresponding Braille character. For example, cell 46 in FIG. 1 is displaying the letter "D." By refreshing display 22, a user can successively read a series of characters, and thereby read text appearing on a computer screen. In accordance with the disclosure, display 32 can generate characters consisting of either a six pin array 36 or an eight pin array 38. This is accomplished by the user selectively turning off or on an adjacent pin pair 32. As used herein, a pin pair 32 is "off" when the pins are in a lowered orientation and are "on" when in a raised orientation. A six pin cell 36 can be generated by turning "off" an adjacent pin pair 32, and an eight pin cell 38 can be generated by turning 'on" an adjacent pin pair 32. Whether the user wishes to generate information employing the six or eight pin array (36, 38) will depend upon the particular application being employed. For example, six pin arrays can be used to convey information found on most websites, whereas academic literature often employs eight pin arrays.

In a further improvement to display 22, the spacing of pins 28 across the face 26 is asymmetrical (i.e. non-uniform). In particular, the spacing between pins 28 along the Y axis (indicated at 42) are generally uniform with all the vertically arranged pins 28 being equally spaced from one another. However, the spacing of the pins along the X axis (indicated at 44) is not uniform. In particular, space 44 forms an alleyway between the adjacent cells 34 along the X axis (i.e. the horizontally arranged pins). This alleyway 44 has a spacing that is greater that the corresponding spacing 42 of the pins along the Y axis. s described below, alleyway 44 allows for capacitive sliders to be positioned upon display 22. It has been found that this asymmetrical spacing is advantageous as it allows for both the display of six or eight pin cells (36, 38) in addition to Braille graphics 48. As illustrated in FIG. 1, Braille graphics 48 are images or shapes that are generated by a corresponding number of pins 28 within display 22. The non-uniform nature of the pin pitch allows both characters and graphics to be generated in a single display. However, the asymmetry may require a conversion to maintain the proper aspect ratio for certain geometric shapes.

Braille Tablet with Capacitive Touch Sliders

The present disclosure also relates to a Braille tablet with capacitive based sensors formed within the face of display. These capacitive sensors can by employed by the user to conduct any of a variety of functions. In one embodiment, the capacitive sensors are placed immediately adjacent each of the Braille cells and function as cursor router keys. They can also be used to track a user's fingers across the face of the display and thereby monitor the user's progress in reading a document. Incorporating the sensors into the face of the display is beneficial as spacing is critical in tablet displays and room for physical keys is limited.

Figure 2:
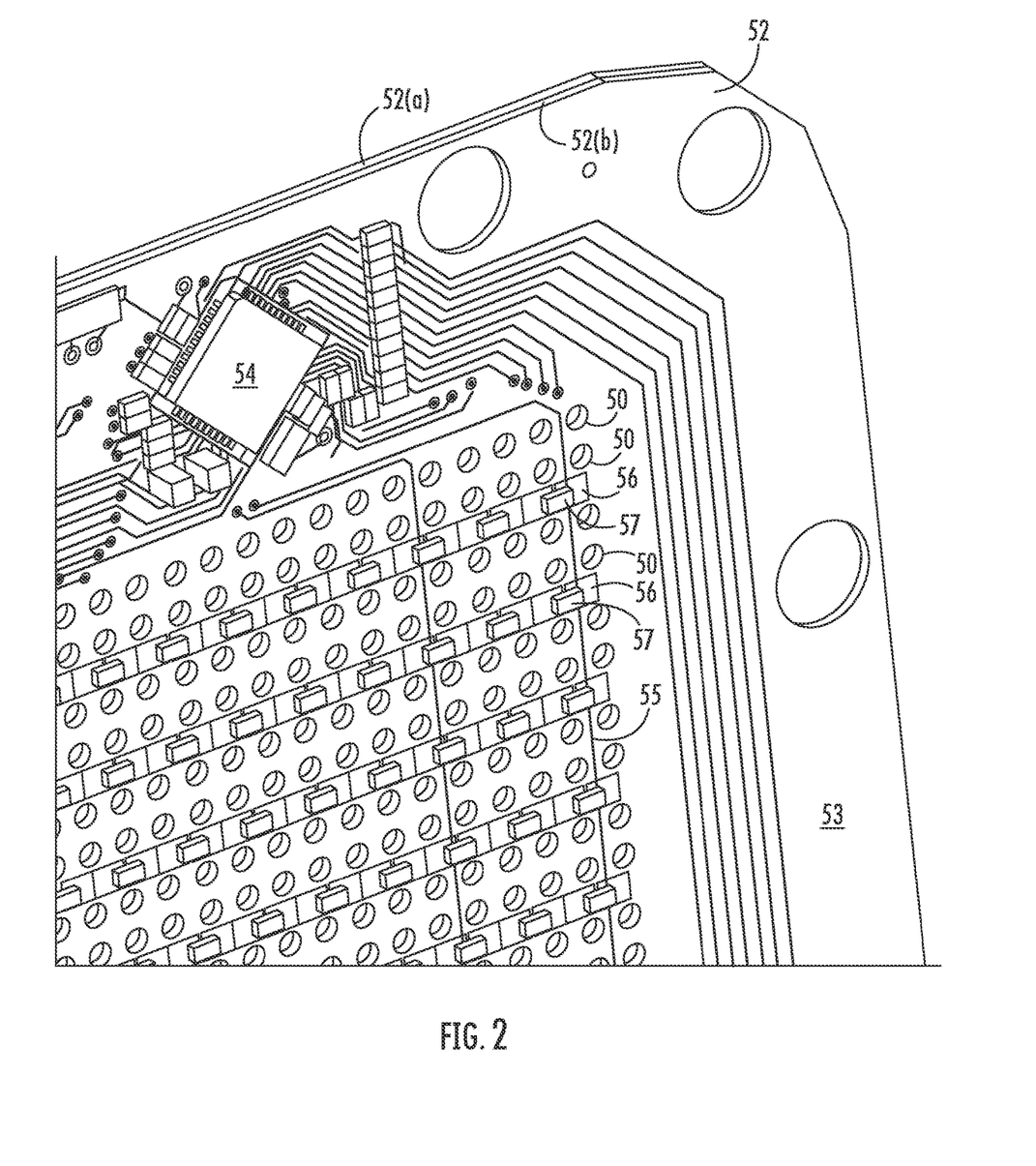
FIG. 2 is a detailed view of the inner surface of the display and illustrating the various capacitive surfaces.
Figure 3:
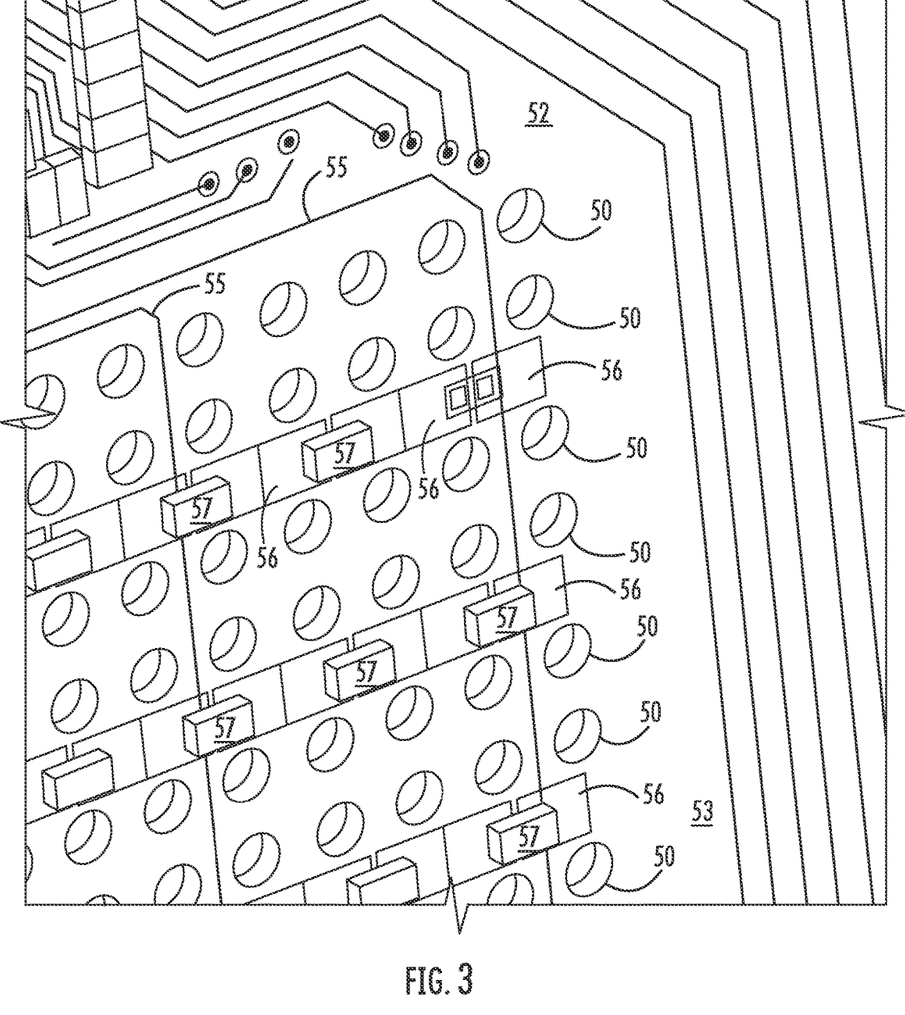
FIG. 3 is detailed view of the capacitive surfaces with one of the associated resistors removed.

In the preferred embodiment, display 22 is formed, at least partially, from a double sided printed circuit board ("PCB") 52. FIGS. 2 and 3 illustrate the underside of the PCB 52. In the depicted embodiment, PCB 52 is formed from two layers of FR-4, which is a glass-reinforced epoxy laminate, that are bonded together. As depicted, the outer layer 52(*a*) forms face 26 of the display and inner layer 52(*b*) forms the inner surface 53. Various electrical components can be soldered onto inner surface 53 of PCB 52. Non-plated through holes 50 are also formed through the doubled sided PCB 52 to accommodate placement of individual pins 28 of display 22. Notably, the outer surface of the PCB 52 is exposed to the user and forms a face of 26 the display. The use of the PCB 52 as the outer surface 26 avoids the need to register an outer cover with holes 50. A microprocessor 54 is associated with tablet 20 and is in electrical communication with PCB 52.

With continuing reference to FIGS. 2 and 3, a series of capacitive, metallic strips 56 are positioned across the an inner surface 53 of PCB 52. In the preferred embodiment, each strip 56 is formed from a series of shorter sub-strips that are bridged together by a series of resistors 57. Resistors 57 allow the sub-strips to function as one large capacitive sensor 56. These elongated strips 56 span the length of display 22. Each strip 56 is positioned immediately below a corresponding alleyway 44 in display 22. This ensures that each strip 56 is located adjacent to an associated Braille cell 34. In the preferred embodiment, each strip 56 is positioned to the left of an associated Braille cell 34. Capacitive strips 56 react to the charge in user's finger as the user touches the exposed surface 26 of display 22. More specifically, a circuit is completed as the user touches surface 26 immediately above an associated capacitive strip 56. Each layer of the PCB (56a and 56b) acts as a dielectric material to create this capacitive circuit. The thickness of the upper, exposed layer 56(*a*) of the PCB 52 can be selected to optimize the touch sensitivity. Capacitive strips 56 will register a user's touch anywhere along their length and are therefore referred to a "touch sliders." Drive lines 55 are used to interconnect adjacent strips 56.

Figure 6A:
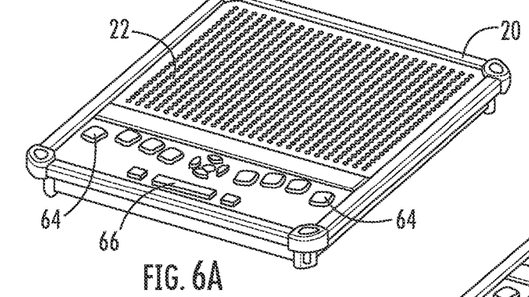
FIGS. 6A-6E are a series of views depicting a user interacting with the present display.
Figure 6B:
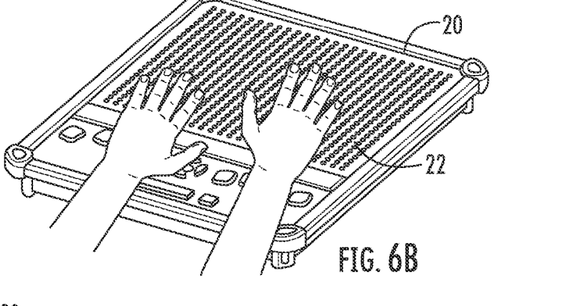
Figure 6C:
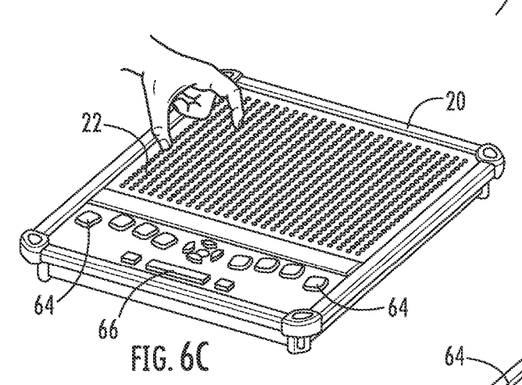

Strips 56 allows the X-Y position of a user's finger to be detected when placed within the alleyway 44 adjacent a particular cell 34 (FIG. 1). As the circuit is completed, microprocessor 54 executes instructions to associate the X-Y finger position with a particular cell 34 upon display 22. Microprocessor 54 will make this determination while taking into account whether display 22 has been configured for a six or an eight pin array. In this regard, strips 56 can be used to monitor the progress of a user's fingers across display 22, as would occur as the user is perceiving or "reading" the displayed Braille characters. FIG. 6B illustrates a user's fingers progressing along display 22. The microprocessor 54 would be employed in determining both the direction and rate at which the user's hands were progressing across the display. The top area of display 22 could then be refreshed in time for the user to sense additional lines of text. This feature would essentially allow the "pages" of a Braille text to be automatically turned as the user progresses through the material.

Figure 6D:
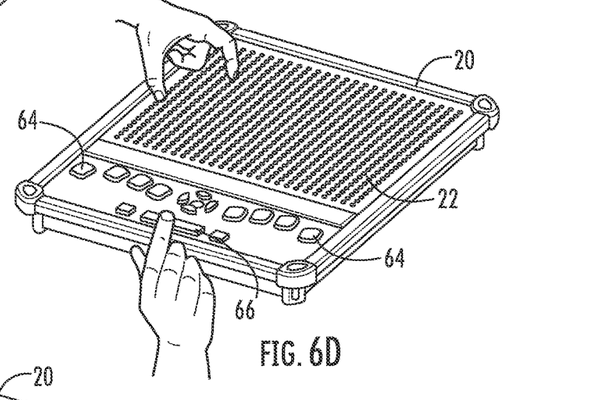
Figure 6E:
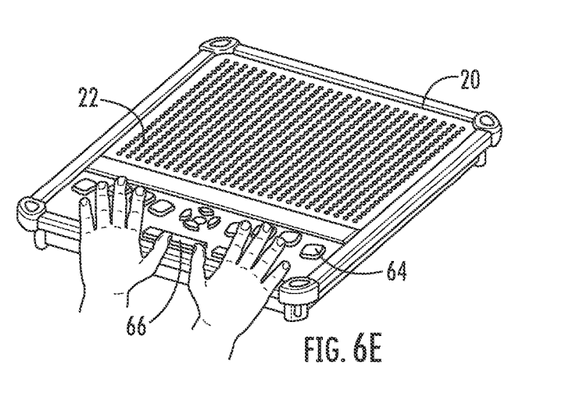

Another application of the strips 56 would be to allow the user to indicate where in the display to move a cursor. This may be used if the user is employing the notetaker function of tablet 22. As illustrated in FIG. 6A, tablet 20 may include a series dot-type keys 64 and a space bar 66 for the purpose of entering Braille characters into display 22. FIG. 6E illustrates a user entering information via keys 64. If the user wishes to place a cursor at a particular location within display 22, the user would move the cursor by depressing space bar 66 along with touching an alleyway 44 adjacent a cell 34 of interest (FIG. 6D). This action signals microprocessor 54 that the user wishes to move the cursor to the identified location upon display 22. Alternatively, it may signal that the user wishes to interact with the associated Braille cell 34 in some other manner. For example, this feature could allow users to perform tasks such as copying, pasting, selecting, and/or editing functions. Using the display based, capacitive sensors in this manner avoids the need for peripherally located cursor router keys that can be challenging for some users.

Pin Blocks and Weighted Pins

Figure 4:
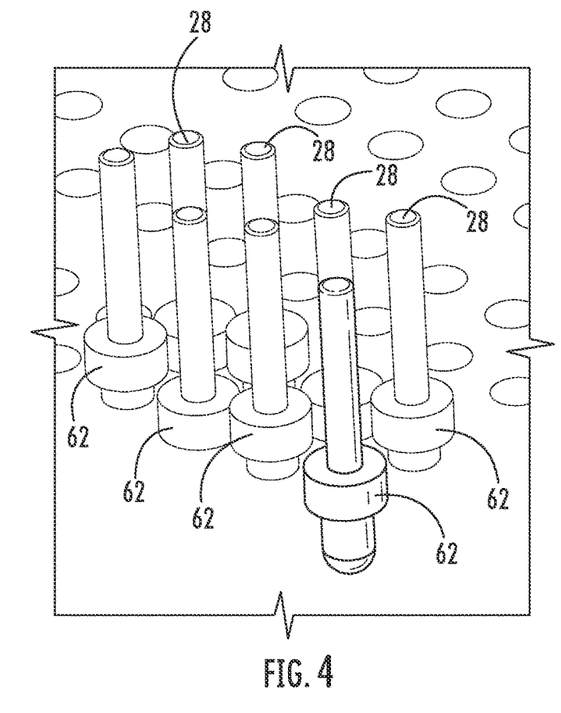
FIG. 4 is a view of an eight pin array with the details of the individual pins depicted.
Figure 5:
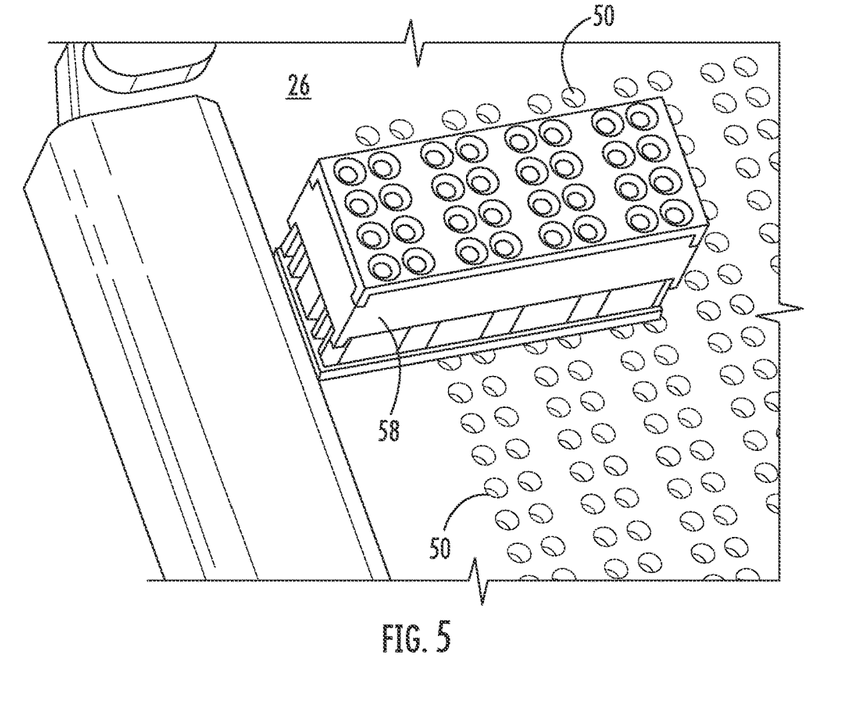
FIG. 5 is a view of pin block being used to place a series of eight pin arrays.

FIG. 5 illustrates a block 58 housing a series of eight pin cells 38. A similar bock (not shown) could be utilized for a series of six pin cells. Block 58 is formed as one modular unit. This allows all the pins 28 to be removed, replaced, or serviced as a discrete unit. FIG. 4 illustrates a weight 62 that can be positioned about the stem of each pin 28. These weights 62 lower center of gravity of each pin 28. This, in turn, allows the pins 28 to be more easily installed via a conventional vibration table.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A Braille tablet with an improved tactile display, the tactile display allowing a user to selectively generate both Braille characters and graphics, the tablet comprising:
   an array of pins positioned across a face of the display, the pins being positioned along X and Y axes;
   the array including a series of pin pairs oriented along the Y axis, each of the pin pairs being selectively turned off or on by the user of the tablet, wherein a pin pair is raised when on and lowered when off;
   the pins of the array defining a series of cells, within an individual cell being used to generate a Braille character, the tactile display selectively displaying either six or eight pin cells, with a six pin cell being generated by turning off an adjacent pin pair and an eight pin cell being generated by turning on an adjacent pin pair;
   the spacing between the pins along the Y axis being uniform with all of the pins being equally spaced from one another;
   the spacing between the cells along the X axis being non-uniform, with the spacing between adjacent cells along the X axis being greater than the spacing of the pins along the Y axis;
   the spacing of the pins across the face of the tactile display allowing the user to selectively display six pin cells, eight pin cells, and graphics.

2. A Braille tablet with an improved tactile display comprising:
   an array of pins positioned across a face of the display, the pins being positioned along X and Y axes;
   the array including a series of pin pairs oriented along the Y axis, each of the pin pairs being selectively turned off or on by the user of the tablet;
   the pins of the array defining a series of cells, within an individual cell being used to generate a Braille character, the tactile display selectively displaying either six or eight pin cells, with a six pin cell being generated by turning off an adjacent pin pair and an eight pin cell being generated by turning on an adjacent pin pair.

3. The Braille tablet as described in claim 2 wherein the spacing between the pins along the Y axis being uniform with all of the pins being equally spaced from one another.

4. The Braille tablet as described in claim 2 wherein the spacing between the cells along the X axis is non-uniform.

5. The Braille tablet as described in claim 2 wherein the spacing between adjacent cells along the X axis is greater than the spacing of the pins along the Y axis.

6. The Braille tablet as described in claim 2 wherein the display can generate graphics in additional to six and eight pin arrays.

7. The Braille tablet as described in claim 2 wherein the pins are actuated via electromagnets.

8. The Braille tablet as described in claim 2 wherein the pins are actuated via bimorph reeds.

9. A Braille tablet with sensors for locating the position of a user's hands, the tablet comprising:
- a display associated with the tablet, the display including a printed circuit board ("PCB"), the PCB including an exposed outer surface and an inner surface;
- a pin array formed over the display, with the pin array defining a series of individual Braille cells, the pin array adapted to display individual Braille characters;
- a microprocessor associated with the tablet and in electrical communication with the PCB;
- a series of capacitive strips formed on the inner surface of the PCB, each capacitive strip being associated with a Braille cell;
- whereby the user can touch the outer surface of the PCB at a location above a capacitive strip to thereby signal the microprocessor that the user wishes to interact with the associated Braille cell.

10. The tablet as described in claim 9 wherein table further includes a physical button that the user can depress along with the outer surface of the display to route a cursor to the associated Braille cell.

11. The tablet as described in claim 9 wherein the capacitive strips are used to monitor the progress of the user's hands across the display.

12. The tablet as described in claim 11 wherein the microprocessor refreshes the display based upon the progress of the user's hands across the display.

13. The Braille tablet as described in claim 9 wherein the pins are actuated via electromagnets.

14. The Braille tablet as described in claim 9 wherein the pins are actuated via bimorph reeds.

15. The Braille tablet as described in claim 9 wherein the pins are arrayed along an X-Y axis and wherein the spacing between the pins along the Y axis is uniform.

16. The Braille tablet as described in claim 9 wherein the spacing between the cells along the X axis is non-uniform.

\* \* \* \* \*